June 19, 1956   F. W. DIXON   2,751,029
FOUR WHEEL DRIVE MECHANISM AND BRAKING UNIT THEREFOR
Filed Dec. 27, 1950   9 Sheets-Sheet 1

INVENTOR
Frederick William Dixon
By Carson, Pitzner, Hubbard, Wolfe.
ATTORNEY

June 19, 1956     F. W. DIXON     2,751,029
FOUR WHEEL DRIVE MECHANISM AND BRAKING UNIT THEREFOR
Filed Dec. 27, 1950     9 Sheets-Sheet 4

INVENTOR
Frederick William Dixon
ATTORNEY

June 19, 1956  F. W. DIXON  2,751,029
FOUR WHEEL DRIVE MECHANISM AND BRAKING UNIT THEREFOR
Filed Dec. 27, 1950  9 Sheets-Sheet 8

INVENTOR
Frederick William Dixon
by: [signature]
ATTORNEY

June 19, 1956  F. W. DIXON  2,751,029
FOUR WHEEL DRIVE MECHANISM AND BRAKING UNIT THEREFOR
Filed Dec. 27, 1950  9 Sheets-Sheet 9

United States Patent Office 2,751,029
Patented June 19, 1956

2,751,029

FOUR WHEEL DRIVE MECHANISM AND BRAKING UNIT THEREFOR

Frederick William Dixon, Reigate, England, assignor to Harry Ferguson Research Limited, Abbotswood, Stow-on-the-Wold, England, a British company Application December 27, 1950, Serial No. 202,894

Claims priority, application Great Britain December 28, 1949

6 Claims. (Cl. 180—44)

The general aim of the present invention is to provide low cost, safe transportation for everyone, everywhere.

Transportation cost involves not only the initial cost of a vehicle and its cost of maintenance but also the cost of building and upkeep for roads. And coupled with the problem of cost is the overriding necessity of safety of operation.

Herein disclosed is a vehicle which is not only itself low in initial and upkeep costs because of its inherent simplicity of construction, but which moreover is capable of affording comfortable travel on the most primitive of roads, and indeed over rough country with no roads at all. Turns can be made at high speed without danger of overturning. The vehicle's braking system is, moreover, so effective as to assure clean, sharp braking without swerving or twisting under all conditions and with complete freedom from possibility of maladjustment.

In attaining the foregoing results, a four-wheel vehicle has been provided in which all four wheels are capable of independent vertical motion by mounting them on individually movable half axles to aid in negotiating even the roughest terrain. Moreover, the vehicle has a four-wheel drive as well as four-wheel braking.

Having in view such general arrangement of the vehicle, a further object of the invention is to afford connections to the wheels both for drive and braking such that all will be rendered effective yet without the damage to tires normally incident to a continuous high speed use of conventional four-wheel drives. In other words, even though all four wheels are always effectually connected for driving and braking, they are nevertheless able to overrun each other as required to take car of slip, steering of the front wheels, and so on.

In the accompanying sheets of drawings forming a part of this specification.

In all of the above described views, like characters of reference are employed to designate like parts throughout.

General description

Referring now to the drawings in detail and in particular to Figs. 1 to 4 inclusive, the vehicle chassis is preferably in the form of an elongated tubular frame member 10. It is supported by pairs of front and rear wheels mounted on two pairs of floating axle assemblies 12, 14 and 16, 18 projecting outwardly from the chassis. Each axle assembly is mounted for independent swinging movement relative to the chassis and constitutes in effect a "half axle."

In the preferred embodiment of the invention, the vehicle motor 20 is suitably supported at the extreme rear end of the chassis or frame member 10. It may be of the type having opposed cylinders, and in the case of a four cylinder motor, may be of H-disposition. Such a motor lends itself to mounting with its major dimensions transverse to the frame 10 yet with its crakshaft in alignment with the fore and aft axis of the frame. The relatively small longitudinal dimension afforded contributes toward a relatively small degree of overhang.

As shown, the motor has an output or driven shaft 22 constituting the driving shaft of the vehicle transmission 24 located on the frame 10 in the region just forwardly of the motor.

The transmission 24, in addition to the driving shaft 22 thereof, includes a driven shaft 26 which extends rearwardly through the tubular chassis frame 10 for the purpose of driving the rear wheels 28 of the vehicle through a rear differential assembly 30. Similarly, the driven shaft 26 extends forwardly through the chassis frame 10 for the purpose of driving the front wheels 32 of the vehicle through a two-way overrunning device or free-wheeling unit 36 and through a front differential assembly 34.

The two-way overrunning device or free-wheeling unit 36 is disposed within the tubular frame adjacent its front end and between the front differential assembly 34 and the transmission 24. It includes an overrunning extension 38 of the shaft 26. The free-wheeling unit is provided for the purpose of allowing the front wheels 32 to overrun the rear wheels 28 when the vehicle is being driven either forwardly or rearwardly. The two-way free-wheeling unit also is provided for the purpose of permitting the four-wheel drive of the wheels by the straight line shaft 26. The free-wheeling unit 36 additionally permits the application of braking torque to all four of the vehicle wheels in either direction of motion of the vehicle, all in a manner that will be made clear presently.

Braking of the vehicle is accomplished by means of a brake assembly 40 which is disposed at the extreme forward end of the chassis frame 10. The brake assembly 40, utilizing a portion of the stationary chassis frame 10 as a reaction member, serves to apply a braking effect or torque to the overunning extension 38 of shaft 26 and, therefore, to the front wheels 32 and to the rear wheels 28 through the free-wheeling unit 36. A parking brake assembly 42 is mounted at the rear of the chassis frame 10 and is disposed beneath the engine 20 and transmission 24 for applying braking torque directly to the driven shaft 26.

A one-way braking mechanism 43 (Fig. 11) is associated with the driven shaft 26 of the transmission 24 for preventing backward motion or gliding of the vehicle when the latter is brought to rest upon an upward incline and the engine is disconnected from the vehicle drive shaft by disengagement of the usual engine clutch or by virtue of a neutral or non-driving condition of the transmission gearing. The one-way braking mechanism 43 is fully described in my co-pending application, Serial No. 202,893, filed December 27, 1950 (now U. S. Patent No. 2,668,609) for Automotive Transmission With Reverse Brake, and no claim is made herein to any novel features claimed in said copending application.

The component parts of the vehicle assembly including the transmission 24, the front and rear differential assemblies 34 and 30, respectively, the overrunning device or free-wheeling unit 36, the brake assemblies 40 and 42, and the suspension system by means of which the half-axles 16 are suspended in floating relationship with respect to the chassis frame 10 will be described subsequently, separately and in detail, in the order named.

*The transmission assembly*

Figure 1:
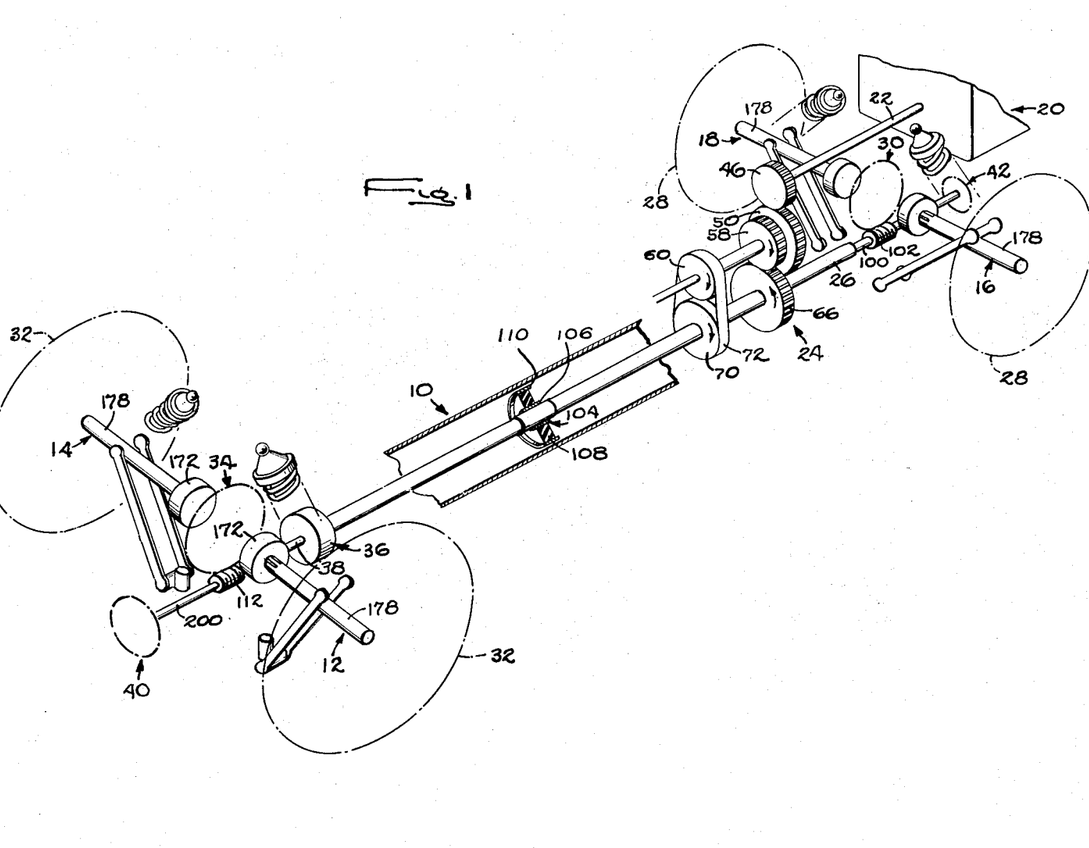
Figure 1 is a perspective view, somewhat schematic in its representation, of an automotive vehicle chassis constructed in accordance with the principles of the present invention and showing the location of the various parts which cooperate to make up the vehicle assembly. In this view certain parts have been broken away to more clearly reveal the nature of the invention.
Figure 2:
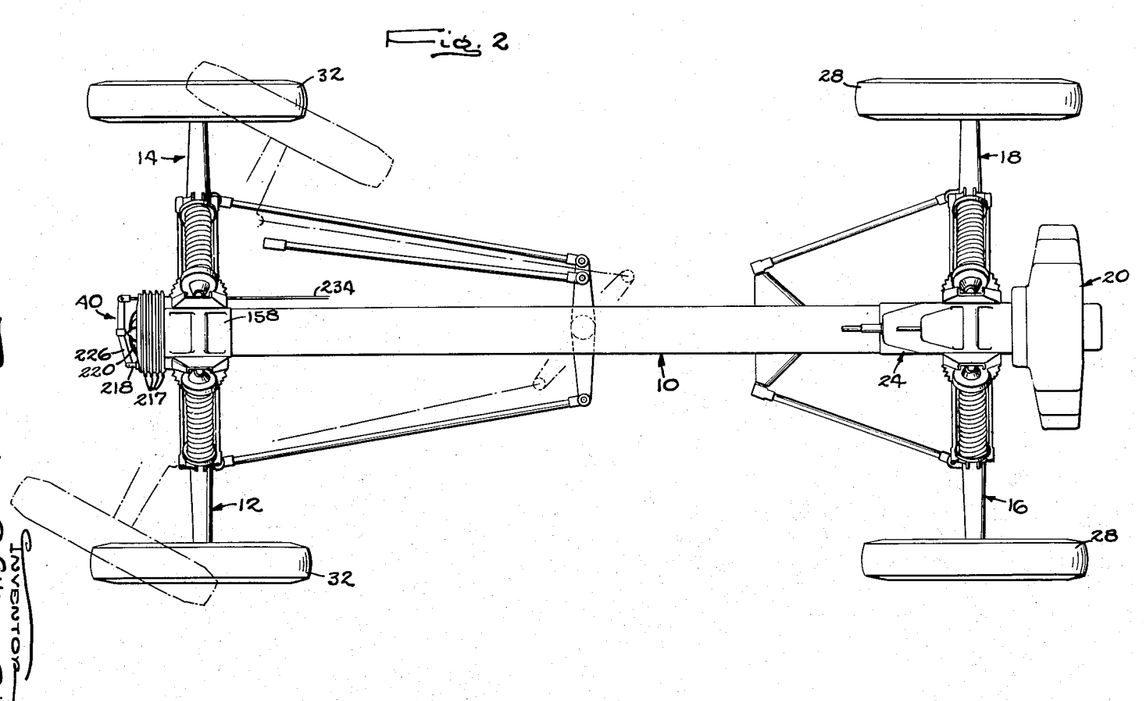
Fig. 2 is a plan view of the structure shown in Fig. 1.
Figure 3:
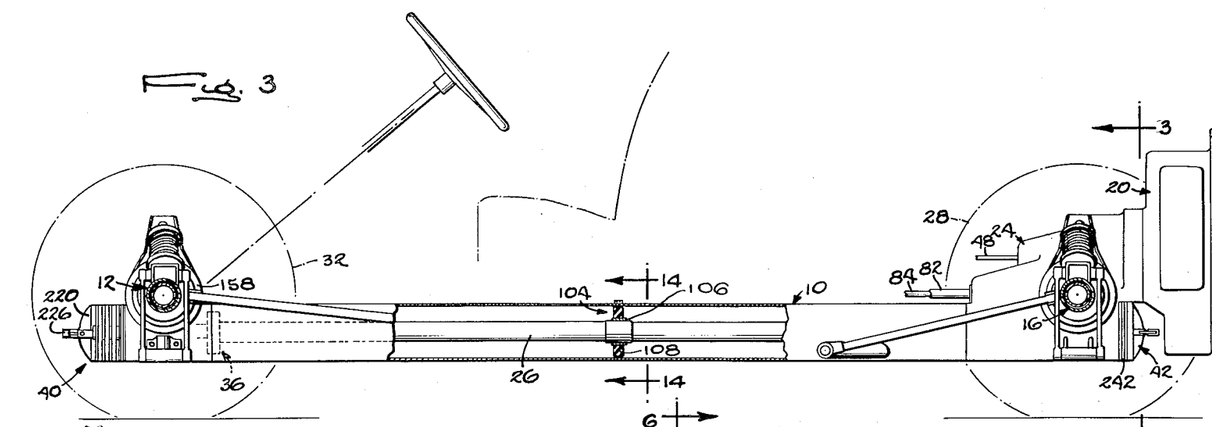
Fig. 3 is a side elevational view of the structure shown in Fig. 1, with certain other parts broken away to further reveal the nature of the invention.
Figure 4:
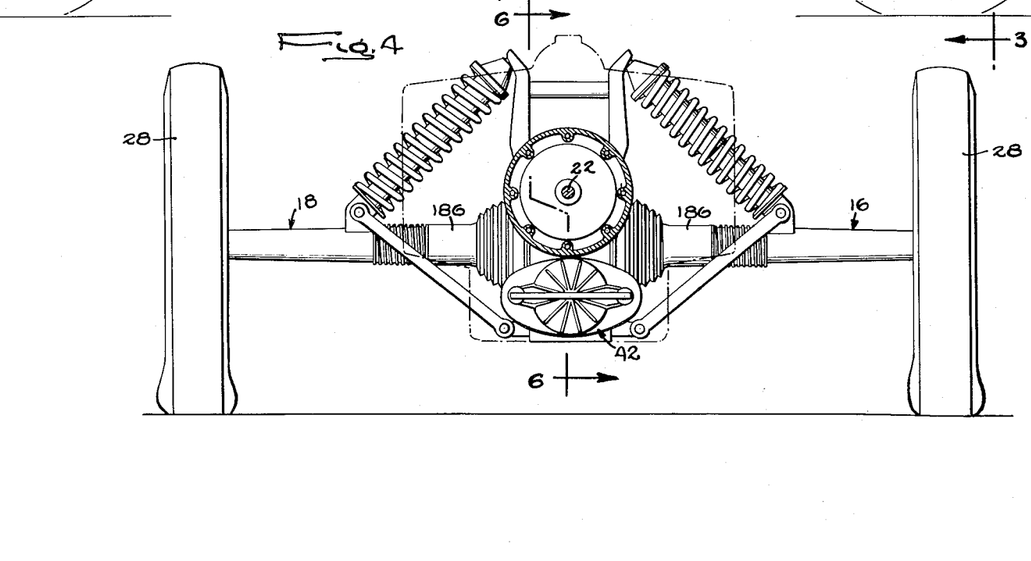
Fig. 4 is a rear elevational view of the structure shown in Fig. 1 with the vehicle engine shown in broken lines.
Figure 5:
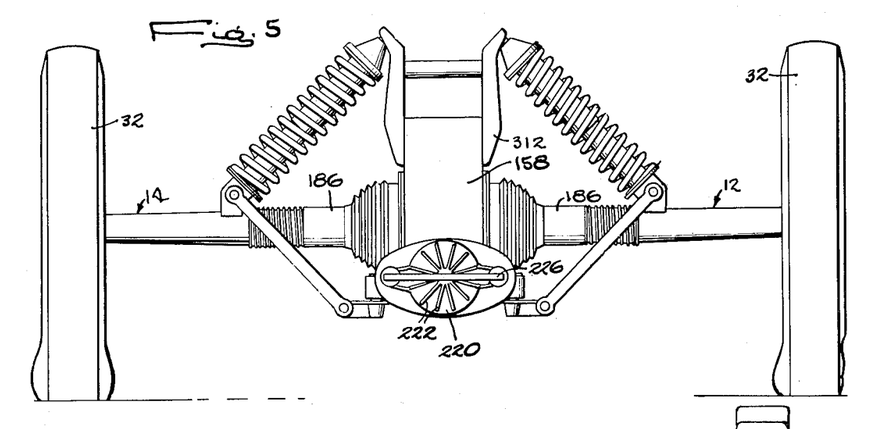
Fig. 5 is a front elevational view of the structure shown in Fig. 1.
Figure 6:
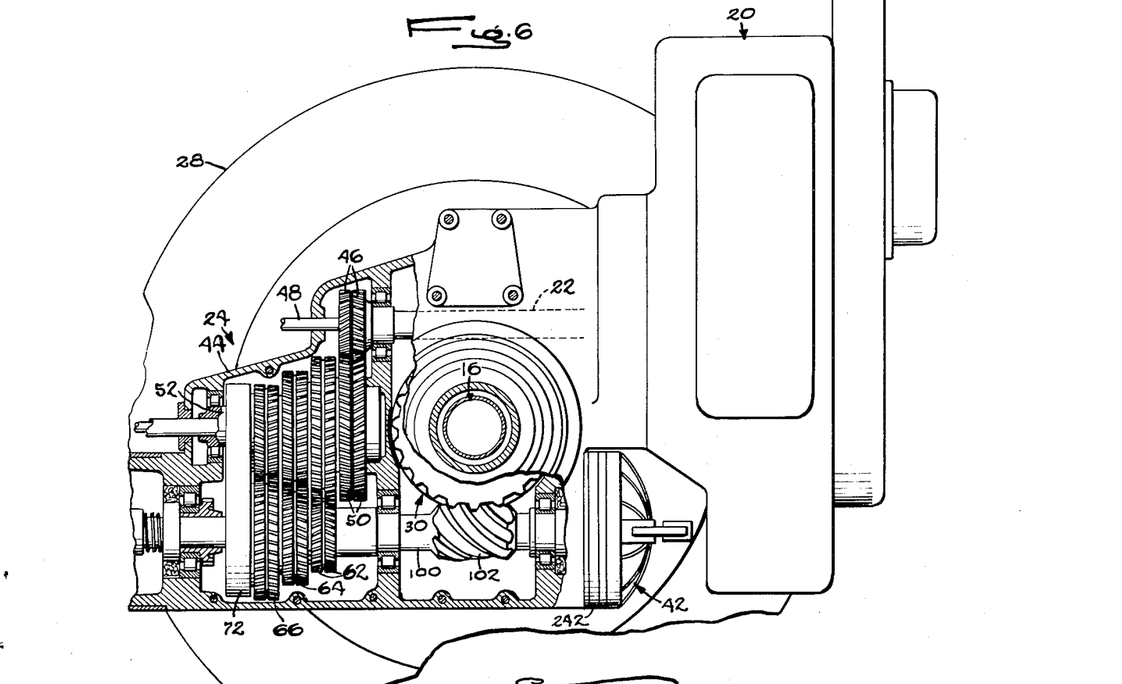
Fig. 6 is a fragmentary side elevational view, partly in section, of the vehicle engine and transmission employed in connection with the present invention.
Figures 11, 12:
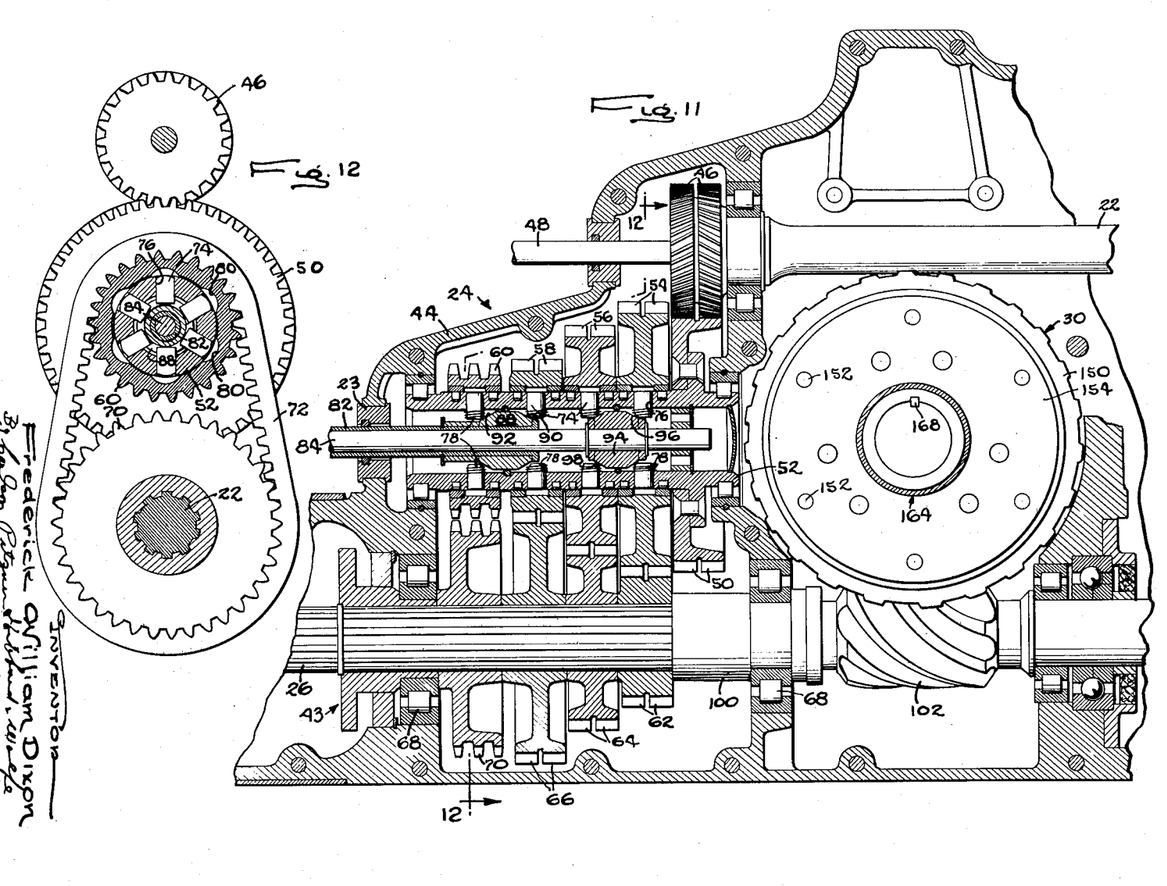
Fig. 11 is a vertical sectional view taken longitudinally through the transmission and transversely through the rear differential unit employed in connection with the present invention.
Fig. 12 is a sectional view taken substantially along the line 12—12 of Fig. 11.

Referring now to Figs. 1, 6 and 11, and more especially to Fig. 11, the transmission assembly 24 is capable of three forward speed gear ratios and one reverse speed gear ratio and involves in its general organization a casing 44 in which all of the operative speed-change gear instrumentalities as well as the one-way braking mechanism 43 are enclosed.

The transmission includes the previously described motor driven shaft 22 which projects into the casing 44 and has mounted thereon a gear 46 which may be of the dual helical type. The shaft 22 is of tubular design and a clutch operating rod 48 projects thereinto for the purpose of causing engagement or disengagement of a clutch assembly (not shown) by means of which the gear 46 may operatively be connected to or disconnected from the driven shaft 22.

The dual gear 46 is in constant mesh with a similar gear 50 mounted on and fixed to a shaft 52 suitably journaled in the casing 44 and hereinafter referred to as the intermediate shaft. On the latter shaft are mounted a plurality of dual helical gears 54, 56 and 58, respectively, together with a loosely mounted sprocket wheel 60. The gears 54, 56 and 58 are in constant mesh with a series of cooperating gears 62, 64 and 66, respectively, fixedly mounted on the transmission driven shaft 26. The shaft 26 is rotatably journaled in antifriction bearings 68 within the casing 44. The driven shaft 26 extends forwardly through the tubular chassis frame 10 and is operatively connected through the free-wheeling unit 36 (Fig. 1) and front differential assembly 34 with the front driving wheels 32 of the vehicle. The shaft 26 extends rearwardly of the transmission assembly 24 and is operatively connected through the rear differential assembly 30 with the rear wheels 28 of the vehicle.

The constantly meshing gears 46 and 50 effect a gear reduction in the drive existing from the shaft 22 to the intermediate shaft 52. The constantly meshing gears 54 and 62 constitute the high or third speed gear ratio drive of the transmission 10. The gears 56 and 64 constitute the intermediate speed gear ratio drive, while the gears 58 and 66 constitute the low speed gear ratio drive of the transmission.

From the above description, it will be seen that continuous rotation of the driving shaft 22 under the influence of the motor 20 will impart continuous rotation to the intermediate shaft 52. The gears 54, 56 and 58, being loosely disposed upon the intermediate shaft 52 and being in constant mesh with the respective gears 62, 64 and 66, mounted on the driven shaft 26, are thus normally free to rotate or to be held stationary according to the tractional condition of movement or non-movement of the vehicle, as the case may be. Coupling of the gear 54 to the intermediate shaft 52 will establish a low speed gear ratio drive through the transmission, this drive existing from the motor shaft 16, gears 46 and 50, intermediate shaft 52, gears 54 and 62 and driven shaft 26. In a similar manner, when the gear 56 is coupled to the intermediate shaft 52, an intermediate forward speed gear ratio drive exists through the transmission leading from the driving shaft 22, constant mesh gears 46 and 50, intermediate shaft 52, and gears 56 and 64 to the driven shaft 26. Likewise with the gear 58 connected to the intermediate shaft 52, a high speed gear ratio drive through the transmission obtains, leading from the driving shaft 22, through gears 46 and 50, intermediate shaft 52 and gears 58 and 66 to the driven shaft 26.

Reverse speed gear ratio through the transmission is effected by means of the sprocket wheel 60 together with a sprocket wheel 70 fixedly secured to the shaft 26 and a chain 72 which passes over the two sprocket wheels and which serves to connect the same together in driving relationship. Thus, when the sprocket wheel 60 is connected to the intermediate shaft 52, a drive will exist from the driving shaft 22 through gears 46, 50, intermediate shaft 52, sprocket wheel 60, chain 72 and sprocket wheel 70 to the driven shaft 26.

The means whereby the gears 54, 56 and 58 and the sprocket wheel 60 may selectively be connected to the intermediate shaft 52 to establish third, second, first and reverse speed gear ratio drives through the transmission 24, comprises a plurality of plungers 74 which are radially slidable in radially extending passages 76 provided in the intermediate shaft 52, there being a series of six radially extending and circumferentially spaced plungers 74 for each of the gears 54, 56 and 58 and a similar series of plungers for the sprocket wheel 60. The plungers 74 are normally maintained in retracted positions by means of spring loaded rings 78 which normally maintain the plungers in their retracted position. The plungers are, however, capable upon application of outward radial thrust thereto of being projected radially outwardly into engagement with a series of internal recesses 80 provided in the respective gears 54, 56 and 58 and in the sprocket wheel 60.

In order to selectively project the plungers 74 outwardly from their retracted positions to selectively establish the various gear ratios of which the transmission is capable of assuming, an outer tubular selector rod 82 is disposed for axial sliding movement in a packing gland 83 at the front of the casing 44, and an inner selector rod 84 is slidably disposed within the rod 82. The two selector rods 82 and 84 extend forwardly of the transmission to points where they are conveniently accessible to the operator of the vehicle for manual operation. The two selector rods 82 and 84 project through the wall of the transmission casing 44 and extend into the hollow tubular intermediate shaft 52 from the front thereof. The outer selector rod 82 carries at its rear end a cam member 88 having dual cone faces 90 and 92. The inner selector rod 84 carries at its rear end a similar cam member 94 having dual cone faces 96 and 98. The cam member 88 normally occupies a position within the tubular intermediate shaft 52 between the two series of plungers 74 associated with the gear 58 and the sprocket wheel 60, but is selectively shiftable upon movement of the tubular selector rod 82 into engagement with either series of plungers 74. The cam member 94 is normally situated within the intermediate shaft 52 between the two series of plungers 74 associated with the gears 54 and 56 and is selectively shiftable upon movement of the inner selector rod 84 into engagement with either series. Thus, when the outer selector rod 82 is moved to the right, as viewed in Fig. 11, the cone surface 90 of the cam member 88 engages the series of plungers associated with the gear 58 and forces them outwardly into the recesses 80 provided interiorly of the gear 58, thus locking the gear to the intermediate shaft 52 for rotation in unison therewith and establishing a low speed gear ratio drive through the transmission as previously described.

When the selector rod 82 is moved to the left as viewed in Fig. 11, the cone surface 92 will engage the series of plungers 74 associated with the sprocket wheel 60 to force the plungers outwardly and lock the sprocket wheel to the intermediate shaft 52 to establish a reverse speed gear ratio drive through the transmission in the manner previously described.

In a similar manner, when the inner selector rod 84 is moved to the left, the series of plungers 74 associated with the gear 56 will be engaged by the cone surface 98 of the cam 94 and the plungers 74 will be forced outwardly into the recesses 80 of the gear 56 to lock the latter to the intermediate shaft 52 and establish intermediate speed gear ratio drive through the transmission. When the inner selector rod 84 is moved to the right, the cone surface 96 will engage the plungers 74 associated with the gear 54 and thus establish high speed gear ratio drive through the transmission.

The arrangement of the transmission assembly 24 described above provides an effective structure having a relatively simple gear selector control mechanism and has the advantage over conventional transmissions in that changes of gear ratios through the transmission are effected by selectively connecting the gears 54, 56 and 58 and the sprocket wheel 60 to a comparatively low speed rotary member, which is the intermediate shaft 52. The general disposition of the transmission on the vehicle chassis is advatageous in that the parallel disposition of the horizontal shafts 22, 52 and 26 in a vertical plane permits the use of a relatively narrow transmission casing 44 which does not project transversely beyond the confines of the projected vertical space over the chassis frame 10.

*The vehicle drive shaft assembly and mountings*

Referring now to Figs. 1, 3, 6 and 11, the driven shaft 26 of the transmission is provided with a rearward extension 100 having mounted thereon a worm 102 which constitutes the driving element of the rear differential assembly 30. The extension 100 projects rearwardly of the differential assembly 30 and cooperates with the parking brake assembly 42 in a manner that will be made clear presently. The shaft 26 may be of unitary construction or it may be of sectional design and the medial region thereof is suitably supported within the tubular frame member 10 by means of an intermediate bearing assembly 104.

Figure 14:
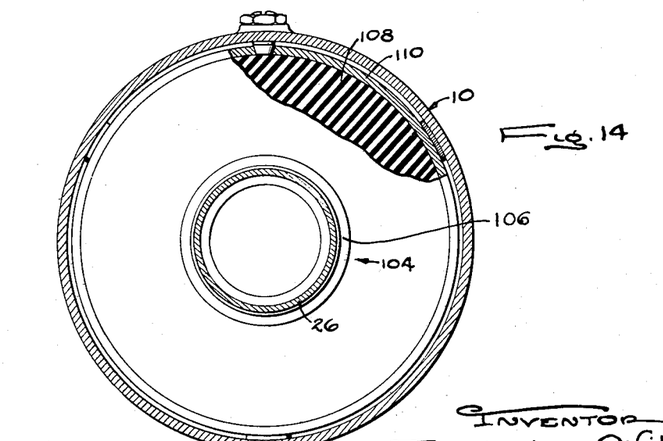
Fig. 14 is an enlarged sectional view taken substantially along the line 14—14 of Fig. 3 with certain parts broken away to bring out certain details of construction.

The bearing assembly 104 includes an inner ring 106 having bonded thereto a rubber or other resilient bushing 108, the latter being enclosed within a split ring 110 mounted within the tubular frame 10 (see Fig. 14). The intermediate bearing assembly 104 is provided for the purpose of eliminating extreme "whip" of the shaft 26 but it allows a certain degree of eccentric motion of the shaft as may arise upon bowing due to ambient temperature changes, slight misadjustments, etc.

The forward end of the shaft 26 extends into and is supported in the overrunning device or free-wheeling unit 36 (Fig. 7) in a manner that will be described subsequently. The overrunning extension 38 of the driven shaft 26 has mounted thereon a worm 112 which constitutes the driving element of the forward differential assembly 34. The extension 38 thus constitutes a propeller shaft for the front wheels, while the shaft 26 with its extension 100 constitutes a propeller shaft for the rear wheels, the free-wheeling device 36 being interposed between these two propeller shafts.

*The two-way overrunning device*

Figure 7:
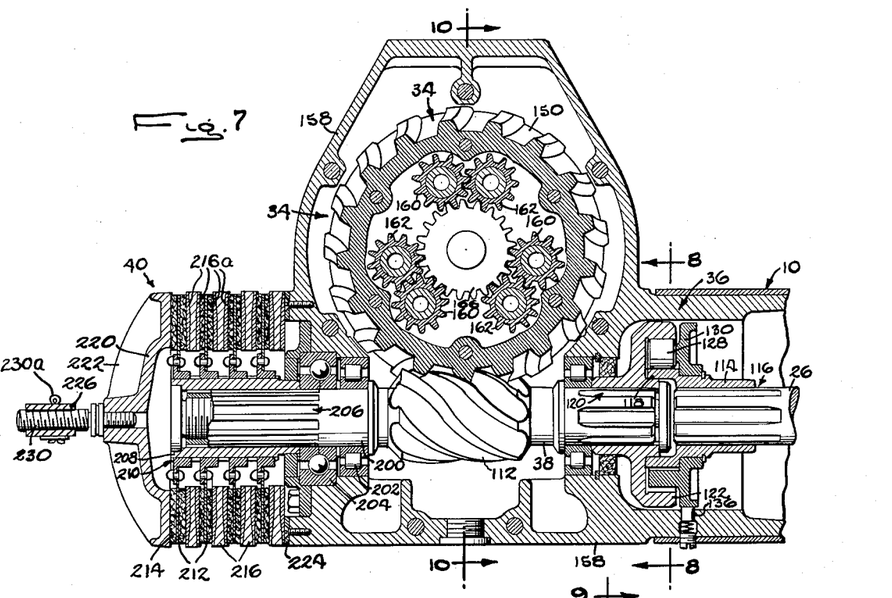
Fig. 7 is a longitudinal sectional view taken on a vertical plane through the forward regions of the vehicle chassis and constituting a transverse sectional view through the front differential unit, front brake assembly and free-wheeling mechanism employed in connection with the present invention.
Figures 8, 9:
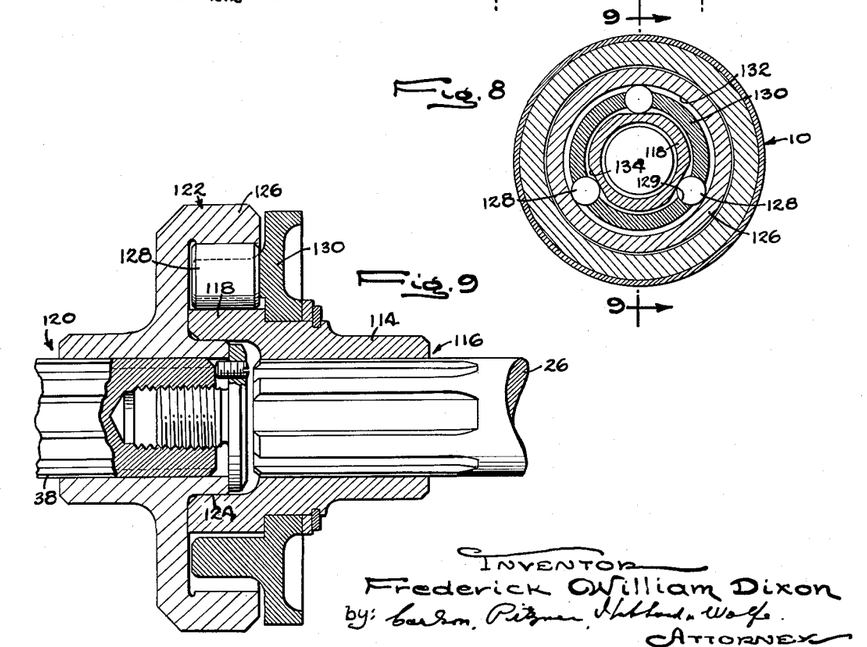
Fig. 8 is a sectional view taken substantially along the line 8—8 of Fig. 7.
Fig. 9 is an enlarged sectional view taken substantially along the line 9—9 of Fig. 8.

Referring now to Figs. 7, 8 and 9, the driving element 114 of the two-way overrunning device or free-wheeling unit 36 is splined as at 116 to the forward end of the transmission driven shaft 26 and is provided with a cup-shaped flange 118. The rear end of the overrunning extension 38 of the shaft 26 has splined thereto as at 120 the driven element 122 of the free-wheeling unit. The central region of the driven element 122 is piloted as at 124 within the flange 118 of the driving element 114. The driven element 122 is provided with an annular flange 126 which encompasses the flange 118 and a series of rollers 128 mounted in spaced slots 129 formed in an annular carrier ring 130, and which are disposed between the outer surface of the flange 118 and the inner surface of the flange 126. The outer peripheral surface of the flange 118 is provided with alternate, arcuate, concentric surfaces 132 and wedge surface portions 134 of considerable lesser curvature. The extent and curvature of the surface portions 134 provided on the peripheral surface of the flange 118 and the diameter of the rollers 128 are such that there is a slight clearance between the rollers and the opposed surfaces between which the rollers are adapted to ride when the rollers are centered in position on the wedge surface portions 134. The rollers 128 are adapted to become wedged or locked between the opposed surfaces when they move on either side of the center to positively lock together the driving and driven elements 114 and 122 of the free-wheeling unit 36. Means are provided for imposing a frictional drag on the intermediate floating annular ring 130 and this means may consist of a carbon brush 136 or other friction element.

In the operation of the free-wheeling unit 36 positive or faster rotation of the driven shaft 26 in either direction with respect to the extension 38 causes the wedge surfaces 134 to carry the rollers 128 in either direction from their centered positions on the surfaces 134 until such time as they become wedged against the cylindrical inner surface of the flange 126 provided on the driven element 122 so as to drive the driven element 122 and consequently the front wheel propeller shaft 38. On the other hand, the driven element 122 and consequently the shaft 38 is capable of overrunning the shaft 26 in either direction since its cylindrical surface is unable to carry the rollers in either direction from their central positions on the wedge surfaces 134. From the above description it will be seen that the front wheels 32 of the vehicle are capable of overrunning the rear wheels 28 thereof in either direction as may be necessary during turning movement of the vehicle when the same is traveling either in a forward direction or in a reverse direction.

*The front and rear differential assemblies*

The front and rear differential assemblies 34 and 30 are substantially identical so that a description of one of these assemblies will suffice. The front differential assembly has been illustrated in detail in Figs. 7 and 10. It involves in its general organization a worm or crown wheel 150 which is in the form of a ring. The latter is mounted by means of circumferentially spaced studs 152 between a pair of side plates 154 having laterally turned flanges 156 formed thereon. By means of these flanges the assembly, including the worm wheel 150 and side plates 154, may be rotatably mounted within a casing 158 which constitutes the casing of the differential unit 34.

Figure 10:
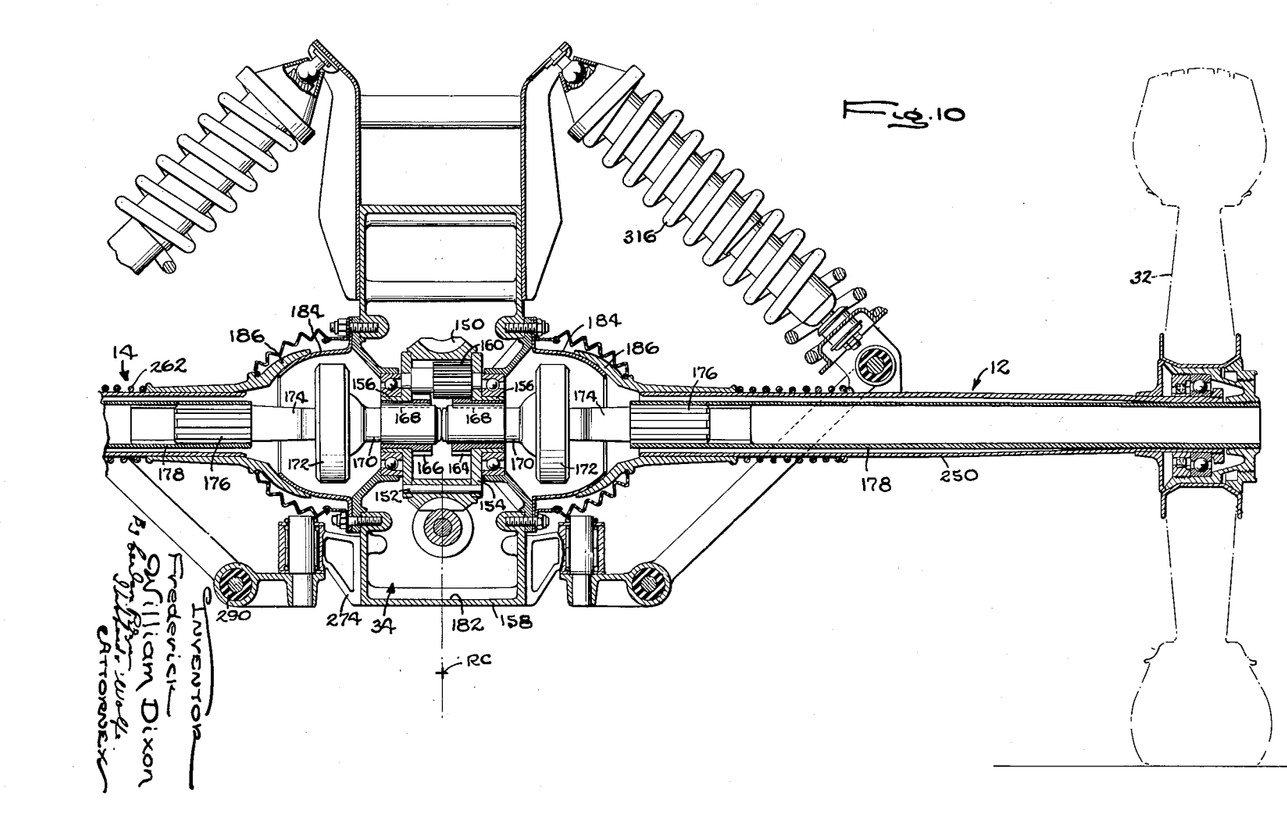
Fig. 10 is a vertical sectional view taken substantially on the plane indicated by the line 10—10 of Fig. 7 and illustrating the front suspension system for the vhicle.

The assembly just described including the ring-like worm wheel 150 and side plates 154 constitutes a planet carrier on which is rotatably mounted a plurality of pairs of planet gears, the two gears of each pair meshing with each other and being designated at 160 and 162, respectively. A pair of sun gears 164 and 166 are keyed as at 168 to the input stub shaft ends 170 of respective universal joint assemblies 172 having tubular output stub shafts 174 which are splined as at 176 to right and left hollow sliding axle members 178 to form axially extensible wheel driving shafts, the nature and function of which will presently be explained more fully. The planet gears 160 and 162 are arranged in staggered or offset fashion and each gear meshes with one of the sun gears, the gears 160 meshing with the sun gear 164 and the gears 162 meshing with the sun gear 166.

The differential action of the arrangement of gearing just described and including the planet gears 160, 162, and the sun gears 164, 166, together with the planet carrier 150, 154, may be best considered by eliminating the tractional considerations of the vehicle wheels. Thus, the input stub shaft ends 170 are operatively connected together in reverse driving relationship when the driving shaft 38 is held stationary by the gear train leading from one sun gear 164 through each pair of planet gears 160, 162, and the other sun gear 166 to the input stub shaft end 170.

A sump 182 is provided in the lower regions of the differential housing or casing 158 and the latter casing has secured thereto on opposite sides thereof a bell housing 184 having universal sliding engagement with a complementary extension 186 which constitutes a part of the axle assemblies 12 and 14.

The front brake assembly

Figure 13:
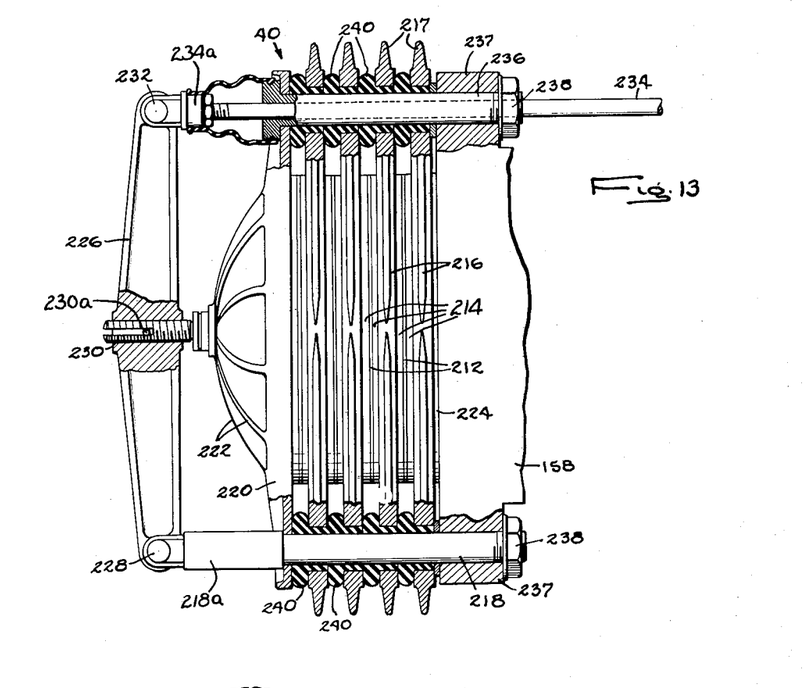
Fig. 13 is an enlarged horizontal sectional view taken transversely through a front brake mechanism amployed in connection with the invention.

Referring now to Figs. 7 and 13 wherein the front brake assembly 40 is illustrated in detail, the front wheel driving shaft 38 or overrunning extension of the vehicle driving shaft 26 is provided with a forward extension 200 which is mounted in antifriction roller bearings 202 and thrust bearings 204 provided in the differential casing 158. The extension 200 is splined as at 206 to a surrounding sleeve 208 which in turn has splined thereon as at 210 a plurality of rotary driven friction plates 212 preferably made of steel and having in opposite sides thereof friction linings or facings 214 of suitable material such as is used in brake linings. Interleaved between these plates 212 are a plurality of non-rotatable reaction plates 216 which may be of elliptical design and are preferably made of aluminum. They project laterally beyond the confines of the plates 212 and are provided with a series of radiating fins 217 thereon for the purpose of dissipating heat generated within the brake assembly 40. The plates 216 are slidably disposed on a mounting post 218 and a companion sleeve 236 which project forwardly side-by-side through the plates adjacent their peripheral regions. On the faces of the plates 216 are chemically bonded iron friction facings 216a. A relatively heavy pressure plate 220 having heat dissipating fins 222 formed thereon is provided at the extreme forward end of the brake pack and an asbestos or other heat insulating ring 224 is provided at the rear thereof and serves to thermally insulate the operative brake instrumentalities from the differential housing 158.

In order to cause brake engaging and disengaging operations, a cross lever 226 is pivoted as at 228 to the outer end of a sleeve 218a threaded on the post 218. Through the medium of a slotted adjustable pressure pin 230, threadedly received in the pressure plate 220, the lever 226 is adapted to apply pressure to the plate 220 to bring the various braking elements 212 and 216 into braking engagement. The free end of the lever 226 is pivoted by a bolt 232 to a threaded extension or head 234a of an actuating rod 234 which slidably projects through the mounting sleeve or bushing 236. The actuating rod 234 may extend rearwardly of the vehicle and may be connected with a foot pedal or other lever (not shown) conveniently located for actuation by the driver of the vehicle. The sleeve 236 and companion post 218 project through bosses 237 provided on the differential housing 158 and a pair of nuts 238 are threadedly received on these two members.

The non-rotating plates 216 are maintained in spaced relationship by means of a series of resilient ring-like members 240 which surround the bushing 236 and the post 218 and which constitute yieldable means for releasing the braking action of the brake assembly when the actuating rod 234 is released.

A brake mechanism constructed and located as described is extremely simple to service. To inspect or replace the braking surfaces one has only to unscrew the threaded extension 234a on the actuating rod 234 and swing the lever 226 forward. Then by twisting the lever 226 the sleeve 218a is unscrewed from the post 218. The pack of brake plates 212, 216 are thus freed so they can be slid forward on the supports 218, 236 for removal and repair or replacement. The simplicity of such an operation compared to the relining of ordinary wheel brake drums will be strikingly manifest.

To adjust the brake is equally simple. All one has to do is to remove the cotter pin 230a from the pressure pin 230, then insert a screw driver in the slotted end of the pin 230 and turn it. By so turning the pin 230 the brake application for a given travel of the actuating rod 234 is, of course, changed. The braking for all four wheels remains uniform throughout any such adjustment so that all problems of equalizing braking on the several wheels are eliminated. After adjustment, the cotter pin 230a is replaced to keep the pin 230 from being jarred out of position.

Since the brake assembly is exposed at the end of the vehicle, access to it for service or adjustment as described is very easy indeed.

The parking brake assembly

The rearward extension 100 (Fig. 11) of the vehicle driving shaft 26 projects rearwardly beyond the rear differential assembly 30 (Fig. 3) and has associated therewith the previously mentioned parking brake assembly 42. This latter assembly is similar in its construction to the front brake assembly 40 but utilizes a single rotating pressure plate 242 in lieu of the plural pressure plates 212 of the brake assembly 40.

Alternative vehicle construction

Figure 15:
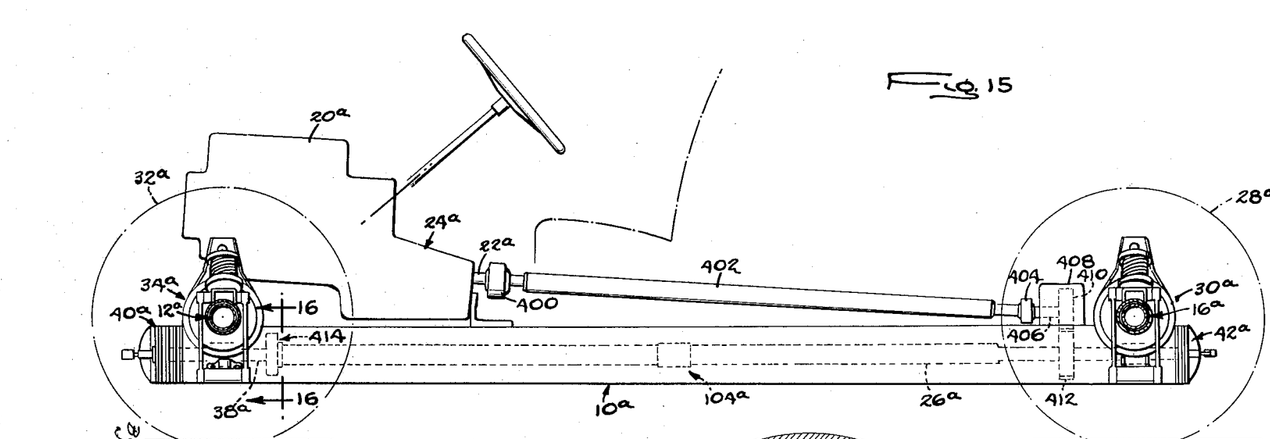
Fig. 15 is a side elevational view somewhat schematic in its representation of a modified form of automotive vehicle chassis showing the location of the various parts which cooperate to make up the vehicle assembly.

In Fig. 15 a modified form of vehicle construction is disclosed which embodies many of the advantageous features of the vehicle shown and described in connection with Figs. 1 to 14, inclusive.

In the form of the vehicle shown in Fig. 15 many of the parts and assemblies employed are identical with or correspond to parts which have been disclosed in connection with the previously decsribed vehicle and, to avoid repetitious description, similar characters of reference have been employed to designate the corresponding parts in Fig. 15 and in Figs. 1 to 14, respectively.

In the modified form of the vehicle, as illustrated, the chassis frame member 10a, the front brake assembly 40a, the parking brake assembly 42a, the front and rear differential assemblies 34a and 30a, respectively, the driving shaft 26a and its mountings such as the bearing assembly 104a, the motor 20a, the transmission assembly 24a, the axle assemblies 12a and 16a, and the suspension mechanism, remain substantially the same as in the form of the invention illustrated in Figs. 1 to 14, inclusive.

In the vehicle of Fig. 15, the motor 20a and transmission assembly 24a are mounted on the vehicle chassis 10a adjacent the forward end thereof and the driven shaft 22a of the transmission is connected through a universal joint assembly 400 with an upper drive shaft 402 which in turn is connected through a universal joint assembly 404 with a shaft 406 suitably journaled in a gear casing 408. The shaft 406 has mounted thereon a gear 410 which meshes with the gear 412 mounted on the main driving shaft 26a which extends through the chassis frame 10a. Thus it will be seen that the vehicle driving shaft 26a is adapted to be driven from the motor 20a through the shaft 402 and gears 410 and 412. A one-way acting overrunning device or free-wheeling unit 414 is interposed between the vehicle driving shaft 26a and its forward extension 38a which serves to drive the front vehicle wheels 32a through the differential assembly 34a.

Figure 16:
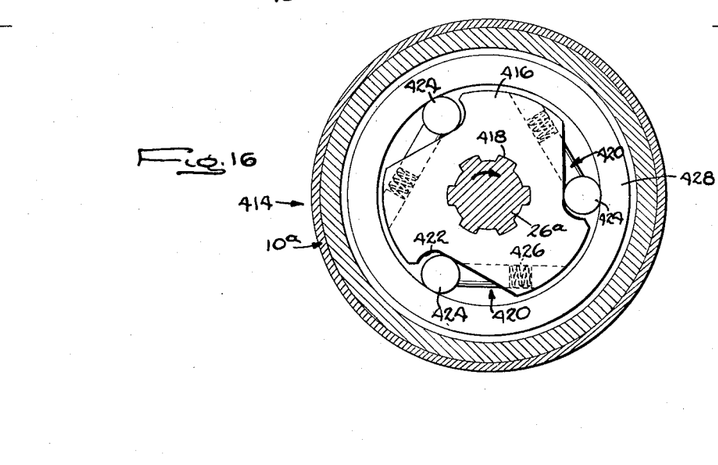
Fig. 16 is a sectional view taken substantially along the line 16—16 of Fig. 15.

The free-wheeling unit 414 is shown in detail in Fig. 16 and includes a driving member 416 splined as at 418 to the shaft 26a and having a plurality of tapered recesses 420 provided in its peripheral regions, each recess terminating in a relatively sharp, arcuate incline 422. A series of rollers 424 which are spring pressed as at 426 are disposed within the recesses and cooperate with a cup-shaped ring member 428 suitably mounted on the overrunning extension 38a.

In the operation of the overrunning device or free-wheeling unit 414, rotation of the shaft 26a in a clockwise direction, as viewed in Fig. 16, will cause a wedging of the rollers 424 between the bottom surfaces of the recesses 420 and the inner circumferential surface of the cup-shaped member 428 to effect driving of the shaft 38a. The cup-shaped member 428 is, however, capable of overrunning the shaft 38a in a clockwise direction and in such an event the rollers 424 will move against the sharply inclined ends 422 of the recesses 420 and thus they will be freed from frictional contact with the cup-shaped member 428.

The modified form of vehicle shown in Fig. 15, in addition to possessing many of the advantages attributed to the vehicle of Figs. 1 to 14, inclusive, is advantageous in that a four wheel drive is provided in which the front wheels 32a may overrun the rear wheels 28a thus enabling the vehicle to be steered in either direction by varying the axial direction of the front wheels and thus eliminating the necessity of providing a gear transfer mechanism for disconnecting the drive from either pair of wheels while the other pair is being driven. Furthermore, with such a vehicle it is possible to employ tires of oversize dimensions on the rear wheels, which is a common expedient where high speeds are desired, and the vehicle may thus be driven over long distances, or indefinitely without the attendant danger of circumferential friction drag or scrubbing of the front wheels. When conditions arise requiring tractional power at all four wheels as, for example, on slippery roads, or when it is necessary to extricate the vehicle from the mud, a sand bank or the like, any slippage of the rear wheels will automatically bring tractional power to the front wheels through the medium of the overrunning device or free- wheeling unit 414.

The invention is not to be limited to the exact arrangement of parts shown in the accompanying drawings and described in this specification, as various changes in the details of construction may be resorted to without departing from the spirit of the invention. Only insofar as the invention has particularly been pointed out in the accompanying claims is the same to be limited.

I claim as my invention:

1. In an automotive vehicle having a driving motor, a first pair of driven wheels, a second pair of driven wheels, a driving shaft for each pair of wheels, transmission means operatively connecting one of said shafts to the motor in driving relationship, a two-way acting free-wheeling device between said shafts, and means for applying braking torque to the other of said shafts to directly brake the pair of wheels driven thereby and to brake the other pair of wheels through said two-way acting free-wheeling device.

2. In an automotive vehicle having a driving motor, a pair of front driven wheels, a pair of rear driven wheels, and means for displacing said front wheels relative to the vehicle frame for steering purposes, the combination of a driving shaft for said pair of front wheels, a driving shaft for said pair of rear wheels, transmission means operatively connecting said latter driving shaft to the motor in driving relationship, a two-way acting free-wheeling device between said shafts, and means for applying braking torque to said former shaft to directly brake the pair of front wheels and to brake the pair of rear wheels through said two-way acting free-wheeling device.

3. In an automotive vehicle having a driving motor, a pair of front driven wheels, and a pair of rear driven wheels, the combination of differential gearing operatively connecting the wheels of each pair, a driving shaft for one of said pairs of wheels, a driving shaft for the other pair of wheels, said shafts existing in coaxial relationship, transmission means operatively connecting one of said shafts to the motor in driving relationship, a free-wheeling device operatively connecting said shafts, and a braking device for applying torque to one of said shafts for applying braking torque to the pair of wheels driven thereby through their respective differential gearing and for applying braking torque to the other pair of wheels through said free-wheeling device and their respective differential gearing.

4. In an automotive vehicle having a driving motor, a pair of front driven wheels, and a pair of rear driven wheels, the combination of a driving shaft for said pair of front wheels, a driving shaft for said pair of rear wheels, transmission means operatively connecting said latter driving shaft to the motor in driving relationship, a two-way acting free-wheeling device between said shafts, means for applying braking torque to the former shaft to directly brake the pair of front wheels and to brake the pair of rear wheels through said two-way acting free-wheeling device, and means for applying braking torque to said latter shaft.

5. An automotive vehicle comprising an elongated tubular chassis frame, a driving motor mounted on said chassis frame adjacent the forward end thereof, a transmission assembly mounted on said chassis frame adjacent the forward end thereof and immediately behind said motor, a vehicle driving shaft rotatably journaled in said tubular chassis frame and substantially coextensive therewith, said transmission assembly including a transmission driven shaft, an upper drive shaft operatively connected to said drive shaft and extending above the level of said chassis frame rearwardly to a point adjacent the rear of the chassis frame, gear means disposed adjacent the rear of said chassis frame operatively connecting said vehicle driving shaft and upper drive shaft in driving relationship, a pair of front vehicle wheels, a pair of rear vehicle wheels, differential gearing operatively connecting the wheels of each pair, means on said vehicle driving shaft for driving the differential gearing for said rear wheels, a forward overrunning extension for said vehicle driving shaft, means on said overrunning extension for driving the differential gearing for said front wheels, and a braking mechanism at the extreme forward end of said chassis frame for applying braking torque to said overrunning extension.

6. In an automotive vehicle having a pair of steerable front wheels and a pair of rear wheels together with an engine, a four wheel drive and braking system comprising, in combination, front and rear differentials drivingly interposed between the wheels of the respective pairs, a first drive shaft connected to drive said rear differential, means connecting said first drive shaft to be driven by said engine, a second drive shaft connected to drive said front differential, a two-way overrun device interposed between said first and second drive shafts to effect driving of the latter by the former and permitting overrunning of the latter with respect to the former when the front wheels run faster than the rear wheels as the vehicle negotiates corners, and means for applying braking torque to the front wheels and hence also to the rear wheels through said two-way overrun device.

References Cited in the file of this patent

UNITED STATES PATENTS

| | | |
|---|---|---|
| 1,104,809 | Laviolette | July 28, 1914 |
| 1,211,531 | Blomstrom | Jan. 9, 1917 |
| 1,351,084 | Winther | Aug. 31, 1920 |
| 1,976,071 | Hoffman | Oct. 9, 1934 |
| 2,043,933 | Sohl | June 9, 1936 |
| 2,067,807 | Williams | Jan. 12, 1937 |
| 2,127,033 | Johnston | Aug. 16, 1938 |
| 2,138,618 | Seyerle | Nov. 29, 1938 |
| 2,154,045 | Herrington | Apr. 11, 1939 |
| 2,158,573 | Eastin | May 16, 1939 |
| 2,212,453 | Perkins | Aug. 20, 1940 |
| 2,406,797 | Buckendale | Sept. 3, 1946 |
| 2,439,659 | Julien | Apr. 13, 1948 |
| 2,501,796 | Tucker | Mar. 28, 1950 |